United States Patent
Golden et al.

(10) Patent No.: US 6,893,483 B2
(45) Date of Patent: May 17, 2005

(54) MULTILAYERED ADSORBENT SYSTEM FOR GAS SEPARATIONS BY PRESSURE SWING ADSORPTION

(75) Inventors: Catherine Marie Anne Golden, Allentown, PA (US); Timothy Christopher Golden, Allentown, PA (US); Paula Jean Battavio, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/406,706

(22) Filed: Apr. 3, 2003

(65) Prior Publication Data

US 2003/0205131 A1 Nov. 6, 2003

Related U.S. Application Data

(63) Continuation-in-part of application No. 10/094,362, filed on Mar. 8, 2002, now Pat. No. 6,565,627.

(51) Int. Cl.[7] .................................. B01D 53/047
(52) U.S. Cl. .................. 95/96; 95/100; 95/130; 95/139; 95/140; 95/143; 96/132; 96/154
(58) Field of Search ................ 95/96–106, 127, 95/130, 138–140, 143, 217; 96/130, 132, 134, 135, 143, 144, 154, 153

(56) References Cited

U.S. PATENT DOCUMENTS

| | | | |
|---|---|---|---|
| 3,176,444 A | 4/1965 | Kiyonaga | 55/26 |
| 3,430,418 A | 3/1969 | Wagner | 55/25 |
| 3,564,816 A | 2/1971 | Batta | 55/26 |
| 3,944,403 A | 3/1976 | Simpson et al. | |
| 3,986,849 A | 10/1976 | Fuderer et al. | 55/25 |
| 4,234,326 A | 11/1980 | Bailey et al. | 55/278 |
| 4,702,903 A | 10/1987 | Keefer | 423/359 |
| 4,801,308 A | 1/1989 | Keefer | 55/25 |
| 4,968,329 A | 11/1990 | Keefer | 55/25 |
| 5,082,473 A | 1/1992 | Keefer | 55/25 |
| 5,096,469 A | 3/1992 | Keefer | 55/25 |
| 5,120,331 A | 6/1992 | Landy | 55/74 |
| 5,256,172 A | 10/1993 | Keefer | 123/230 |
| 5,338,450 A | 8/1994 | Maurer | 210/286 |
| 5,498,278 A | 3/1996 | Edlund | 96/11 |
| 5,529,610 A * | 6/1996 | Watson et al. | 95/100 |
| 5,645,626 A | 7/1997 | Edlund et al. | 95/56 |
| 5,674,311 A | 10/1997 | Notaro et al. | |
| 5,693,230 A | 12/1997 | Asher | 210/650 |
| 5,769,928 A | 6/1998 | Leavitt | 95/95 |
| 5,810,909 A | 9/1998 | Notaro et al. | 95/96 |
| 5,906,675 A * | 5/1999 | Jain et al. | 95/99 |
| 5,925,168 A | 7/1999 | Judkins et al. | |
| 5,964,221 A | 10/1999 | McKenna | 128/205.12 |
| 6,027,548 A | 2/2000 | Ackley et al. | 95/96 |
| 6,051,050 A | 4/2000 | Keefer et al. | 95/96 |
| 6,056,804 A | 5/2000 | Keefer et al. | 95/96 |
| 6,126,723 A | 10/2000 | Drost et al. | 96/4 |
| 6,143,057 A | 11/2000 | Bulow et al. | 95/96 |
| 6,152,991 A | 11/2000 | Ackley | 95/96 |
| 6,165,252 A | 12/2000 | Kendall | 95/90 |
| 6,176,897 B1 | 1/2001 | Keefer | 95/98 |
| 6,210,652 B1 | 4/2001 | Bou et al. | 423/659 |
| 6,231,644 B1 | 5/2001 | Jain et al. | |
| 6,293,998 B1 | 9/2001 | Dolan et al. | 95/96 |
| 6,402,813 B2 * | 6/2002 | Monereau et al. | 95/96 |
| 6,406,523 B1 | 6/2002 | Connor et al. | 96/125 |
| 6,500,234 B1 * | 12/2002 | Ackley et al. | 95/96 |
| 6,565,627 B1 * | 5/2003 | Golden et al. | 95/96 |
| 2001/0023640 A1 | 9/2001 | Keefer et al. | 95/96 |
| 2002/0014153 A1 * | 2/2002 | Baksh et al. | 95/96 |
| 2002/0022146 A1 | 2/2002 | Keefer et al. | |

FOREIGN PATENT DOCUMENTS

| | | |
|---|---|---|
| JP | 57132531 | 8/1982 |
| JP | 4110111 | 4/1992 |
| JP | 8266847 | 10/1996 |

* cited by examiner

Primary Examiner—Robert H. Spitzer
(74) Attorney, Agent, or Firm—Keith D. Gourley

(57) ABSTRACT

A gas adsorption composite a high density adsorbent including a high density layer having a first density of at least 0.3 g/cc; and a low density adsorbent having a low density layer having a second density of less than 0.3 g/cc, wherein the high density adsorbent is in substantially contiguous contact with the low density adsorbent and each of the high density adsorbent and the low density adsorbent has an adsorbent surface area of at least 500 $m^2/g$. A pressure swing adsorption process for recovering a product gas from a feed gas, the process including supplying a pressure swing adsorption apparatus including a gas adsorption composite, feeding a feed gas into the pressure swing adsorption apparatus during a feed period not exceeding 100 seconds and recovering the product gas from the pressure swing adsorption apparatus.

23 Claims, 5 Drawing Sheets

MULTILAYERED ADSORBENT SYSTEM FOR GAS SEPARATIONS BY PRESSURE SWING ADSORPTION

CROSS-REFERENCE TO RELATED APPLICATIONS

This application is a continuation-in-part application of Ser. No. 10/094,362, filed on Mar. 8, 2002 entitled "SELF-SUPPORTED STRUCTURED ADSORBENT FOR GAS SEPARATION", now U.S. Pat. No. 6,565,627.

BACKGROUND OF THE INVENTION

This invention relates to pressure swing adsorption (PSA) processes, and more particularly to hydrogen purification, air separation, carbon monoxide production, hydrocarbon removal or recovery via PSA and rapid pressure swing adsorption processes (RPSA).

The increasing demand for hydrogen, particularly in petroleum refining and processing has provided a strong economic motivation to develop processes to recover hydrogen from refinery fuel gas, coke oven gas and other similar sources as well as from more traditional sources such as reformer off-gas. For most applications, a high purity hydrogen product is required.

The process of production and recovery of hydrogen by steam and/or air reforming of hydrocarbon rich gas streams, such as natural gas, naphtha, or other mixtures of low molecular weight hydrocarbons, is well known in the art. Typical commercial sources for the production of hydrogen include reforming of natural gas or partial oxidation of various hydrocarbons. The reforming is carried out by reacting the hydrocarbon with steam and/or with oxygen-containing gas (e.g., air or oxygen-enriched air), producing a hydrogen gas stream containing accompanying amounts of oxides of carbon, water, residual methane and nitrogen. Unless recovery of carbon monoxide is desired, the carbon monoxide is customarily converted to carbon dioxide by water gas shift reaction to maximize the hydrogen content in the stream. Typically, this gas stream is then sent to a PSA unit. Other hydrogen-rich gas sources that can be upgraded by PSA technology to a high purity product include refinery off-gases with $C_1$–$C_6$ hydrocarbon contaminants. See, e.g., U.S. Pat. No. 3,176,444 to Kiyonaga.

In PSA processes, a multi-component gas is passed to at least one of a plurality of adsorption beds at an elevated pressure to adsorb at least one strongly adsorbed component while at least one relatively weakly adsorbed component passes through. In the case of hydrogen production via pressure swing adsorption ($H_2$ PSA), $H_2$ is the weakly adsorbed component that passes through the bed. See, e.g., U.S. Pat. Nos. 3,430,418 to Wagner, 3,564,816 to Batta, and 3,986,849 to Fuderer et al. At a defined time, the feed step is discontinued and the adsorption bed is depressurized in one or more steps, which permit essentially pure $H_2$ product to exit the bed. Then a countercurrent desorption step is carried out, followed by countercurrent purge and repressurization. $H_2$ PSA vessels generally contain a mixture of activated carbon, for bulk $CO_2$ and $CH_4$ removal, followed by a molecular sieve for CO and $N_2$ removal. See, e.g., U.S. Pat. No. 3,430,418 to Wagner.

Hydrogen production via pressure swing adsorption is a multi-million dollar industry supplying high purity hydrogen for chemical producing industries, metal refining industries and other related industries. The cost of hydrogen from integrated reformer/PSA systems is impacted by both the capital and operating costs of the system. Clearly, economic production of hydrogen requires as low as possible operating and capital costs. Capital cost is largely dictated by the size of the reformer and the size of the PSA beds. PSA bed size decreases as the hydrogen productivity of the PSA increases. Hydrogen productivity can be increased by either improved process cycles or improved adsorbents. The size of the reformer is impacted mostly by the hydrogen recovery of the PSA. Improvements in hydrogen recovery in the PSA result in smaller reformer size (as there is a diminished need to produce hydrogen out of the reformer because of better recovery in the PSA). Improvements in hydrogen recovery also result in a reduced demand for reformer feed gas, i.e., natural gas, which generally constitutes the largest operating cost of the reformer. Hydrogen recovery in the PSA can also be improved by either improved process cycles or improved adsorbents.

It is known to use multilayered adsorbent systems in gas separation. However, these multilayered adsorbent systems consist of a combination of active adsorbent layers with inactive adsorbent layers functioning as support or separators. (See U.S. Pat. No. 6,293,998 B1 to Dolan et al.; U.S. Pat. No. 6,143,057 to Bülow et al; U.S. Pat. No. 5,645,626 to Edlund et al., U.S. Pat. No. 5,498,278 to Edlund, U.S. Pat. No. 5,693,230 to Asher, U.S. Pat. No. 6,210,652 B1 to Bou et al., Japanese Patent No. 08266847 to Suzuki et al., and Japanese Patent No. 57/132531 to Imamura et al.)

U.S. Pat. No. 6,406,523 B1 to Connar et al., U.S. Pat. Nos. 6,176,897 B1 5,256,172, 5,096,469; 5,082,473, 4,968,329, 4,801,308, 4,702,903 to Keefer; and U.S. Pat. Nos. 6,056, 804 and 6,051,050 to Keefer et al., and U.S. Publication No. 2001/0023640 A1 to Keefer et al. describe rapid pressure swing adsorption devices for gas separation consisting of an adsorbent material with a reinforcement material and having spacers between adsorbent sheets to establish flow channels in a flow direction tangential to the sheets and between adjacent pairs of sheets.

U.S. Pat. No. 5,338,450 to Maurer describes the apparatus used in a thermal swing adsorption (TSA) system for gas purification. The apparatus consists of a cylinder containing a spirally wound adsorbent bed. The fluid streams to be treated and recovered after treatment in the bed circulate radially through the adsorbent layers. The adsorbent layers comprise adsorbent particles separated by inlet and outlet screens. An impermeable wall is wrapped between the inlet and outlet screens defining an inlet and an outlet channel between the wall and, respectively, the inlet and the outlet screen for, respectively, distributing and collecting the fluid streams. The patent teaches that since the gas is circulated radially through the thickness of the adsorbent layers, screens are necessary to retain and form the layers, and an impermeable wall is required to create the channels for fluid circulation.

U.S. Pat. No. 6,152,991 to Ackley, U.S. Pat. No. 6,027,548 to Ackley et al., U.S. Pat. No. 5,810,909 to Notaro et al., U.S. Pat. No. 5,769,928 to Leavitt, U.S. Pat. No. 6,165,252 to Kendall, U.S. Pat. No. 5,674,311 to Notaro et al., and Japanese Patent No. 04110011 Shusaku et al. describe adsorption gas separation systems where an adsorber is sectioned in multiple zones and each zone contains a single adsorbent. Consequently, at a given time in the process, the gas molecules in a given section of the adsorber can be in contact with one kind of adsorbent only.

A number of patents refer to the use of multilayered adsorbent system for applications that differ from pressure swing adsorption and require the use of filters or membrane systems. (See U.S. Pat. No. 5,120,331 to Landy, U.S. Pat. No. 5,964,221 to McKenna, and U.S. Pat. No. 6,126,723 to Drost).

U.S. Pat. No. 4,234,326 to Bailey et al. discloses using an activated carbon cloth in adsorptive filters for air purification. Bailey et al. describe a filter comprising layers of charcoal fabric arranged in various ways to accommodate different flow configurations, but preferentially positioned parallel to the direction of the gas flow. Air-permeable layers made of glass fiber, wool fiber, or open cell foam with a thickness between 0.1 and 1 mm separate the adsorbent fabric layers. However, this patent does not disclose the use of an adsorbent layer having higher density than the cloth. In addition, the patent does not address the use of such an adsorbent cloth in a cyclic adsorptive process and does not teach the benefits of fast mass transfer in a fast cycle adsorption process. In fact, the adsorptive filter is not regenerated, but disposed of after it is spent.

The earlier patents describe conventional pressure swing adsorption cycle processes for gas separation where the cycle time is in the order of minutes. (See U.S. Pat. No. 3,430,418 to Wagner, U.S. Pat. No. 3,564,816 to Batta, and U.S. Pat. No. 5,250,088 by Yamaguchi et al.).

The more recent patents related to rapid pressure swing adsorption describe much shorter cycle times, in the order of seconds or even fractions of a second. (See U.S. Pat. No. 6,231,644 B1 to Jain et al., U.S. Pat. No. 6,176,897 B1 to Keefer, and U.S. Pat. No. 6,056,804 to Keefer et al.).

Accordingly, it is desired to provide an improved system for rapid PSA. It is further desired to provide such systems comprising the use of improved adsorbents.

All references cited herein are incorporated herein by reference in their entireties.

BRIEF SUMMARY OF THE INVENTION

Accordingly, the invention provides a gas adsorption composite comprising: high density adsorbent comprising a high density layer having a first density of at least 0.3 g/cc and a low density adsorbent comprising a low density layer having a second density of less than 0.3 g/cc, wherein the high density adsorbent is in a substantially contiguous contact with the low density adsorbent, and each of the high density adsorbent and the low density adsorbent has an adsorbent surface area of at least 500 m$^2$/g.

Also, provided is a pressure swing adsorption process for recovering a product gas from a feed gas, said process comprising: supplying a pressure swing adsorption apparatus comprising a gas adsorption composite of claim 1; feeding a feed gas into said pressure swing adsorption apparatus during a feed period not exceeding 100 seconds; and recovering said product gas from said pressure swing adsorption apparatus.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
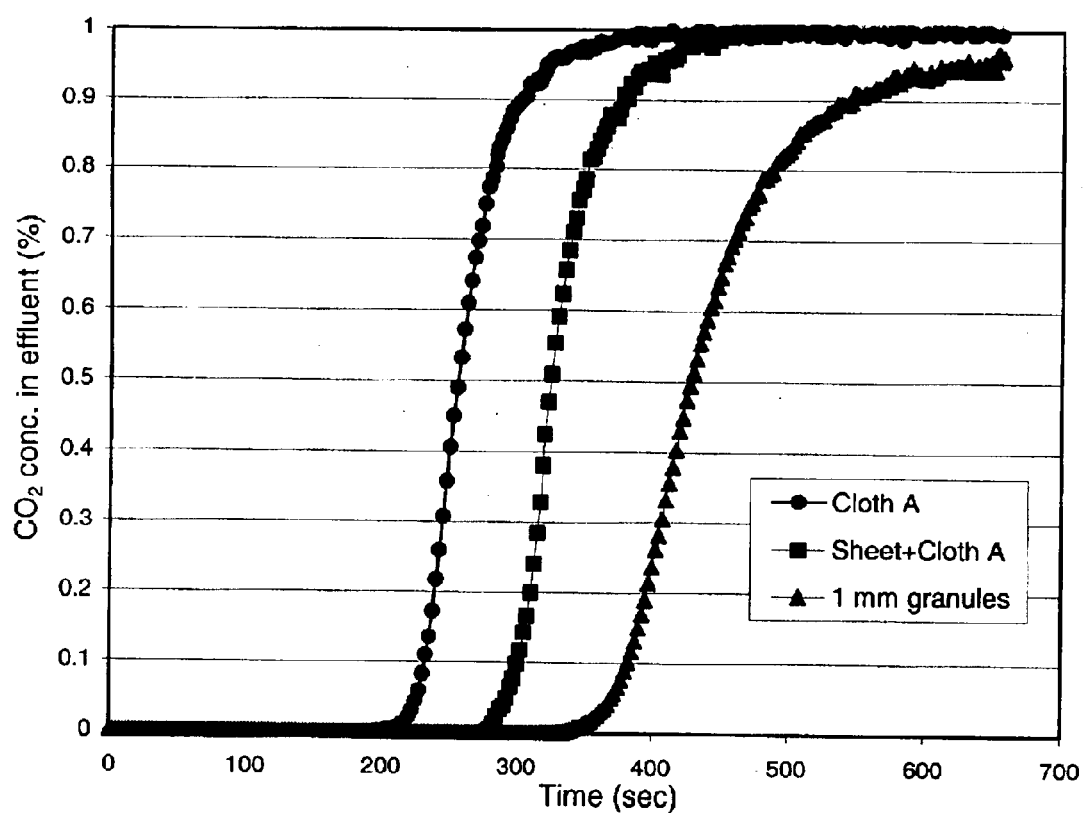
FIG. 1 is a graph showing breakthrough profiles for 1% $CO_2$ in helium at 50 psig (0.34 MPa) in three adsorbent systems including a cloth, a sheet+cloth composite of the present invention, and 1 mm granules.

Conventional gas separation by PSA is usually performed using beds packed with adsorbent beads or granules. In order to reduce the size of the existing PSA systems and still maintain the same product throughput, the process cycle time needs to be reduced and, consequently, the process stream flow rate needs to be increased. Maintaining a low pressure drop and achieving a fast transfer rate of the sorbate molecules from the gas to the adsorbed phase becomes crucial in a rapid PSA configuration when the molecules' residence time in the adsorber is shortened.

The mass transfer/pressure drop characteristics of conventional packed beds do not allow operating the process at fast cycles (more than a few cycles per minute). New adsorbent configurations that present a plurality of channels with less resistance to gas flow and, therefore, less pressure drop were selected as good candidates for rapid PSA systems. Such materials also require fast mass transfer and must exhibit large film and solid mass transfer coefficients, which translate into very small channels as well as very thin adsorbent walls. Simultaneously, the working capacity of the materials must be high enough and the void volume sufficiently small to minimize the adsorber's size and operate at good product recovery.

Various material configurations satisfy most of the requirements listed above, but rarely offer all of those advantages simultaneously. For instance, adsorbent beads used in a traditional packed bed will exhibit high pressure drop at large flow rates. Adsorbent monoliths would be required to have very high cell density (several hundred to over one thousand cells per square inch or about ⅙ as many cells per square centimeter) in order to have fast adsorption kinetics as well as reasonable bulk density. Manufacture of such monoliths is complex, and monoliths at such high cell density with a large enough inventory of active adsorbent are not available yet. In the case of laminate structures, in order to satisfy the above requirements, the thickness of the adsorbent sheets and the size of the space between consecutive sheets both need to be very small and require external support, reinforcement matrix and spacing systems. Methods of creating such spacing systems involve creating embossing or ridges on the laminates, corrugating the laminates and alternating corrugated and non-corrugated layers, and using an external spacing device between the adjacent layers. These spacing systems should be chosen to minimize the pressure drop through the adsorber and should not obstruct the flow path between adjacent layers. Adsorbent fabrics can exhibit the combined benefits of conventional beads as well as structured adsorbents for rapid PSA applications (RPSA). Fast kinetics, low-pressure drop and no requirement for external support or spacers characterize those materials and make them excellent candidates for RPSA processes.

It is a goal of the current invention to describe the use of gas adsorption composite comprising adsorbents with different density and permeability wherein each adsorbent has an adsorbent surface area of at least 500 m²/g. Another goal of the current invention is to describe the use of such gas adsorption composite in a PSA process. Yet, another goal of the current invention is to describe the use of such gas adsorption composite in a rapid PSA process.

As used herein, the term "PSA" covers not only the strictly speaking PSA processes, but also similar processes such as VSA (Vacuum Swing Adsorption) and MPSA (Mixed Pressure Swing Adsorption).

The invention flows from the inventors' discovery that using all active adsorbent layers in a composition wherein the layers differ in their density and permeability instead of a combination of an active and an inactive adsorbent layers allows to significantly reduce the size of an adsorbent vessel needed to process the same amount of feed gas.

A gas adsorption composite of the present invention includes a high density adsorbent comprising a high density layer having a first density of at least 0.3 g/cc, preferably at least 0.4 g/cc and a low density adsorbent comprising a low density layer having a second density of less than 0.4 g/cc, preferably less than 0.3 g/cc, wherein the high density adsorbent is in substantially contiguous contact with the low density adsorbent. Each of the high density adsorbent and the low density adsorbent has an adsorbent surface area of at least 500 m²/g and preferably at least 1000 m²/g.

The terms "low density adsorbent" and "high permeability adsorbent" are used interchangeably herein. Also, the terms "high density adsorbent" and "low permeability adsorbent" are used interchangeably herein. Indeed, the gas permeability of adsorbents generally decreases with increasing adsorbent density. Consequently, a relative comparison between the two types of adsorbent layers, which must be used simultaneously in the present invention, can be drawn on the basis of either gas permeability or density.

In certain embodiments, the high density layer of the gas adsorption composite of the present invention has a first air permeability greater than 0 and up to 0.5 Darcy (0.494×10⁻¹² m²), and the low density adsorbent has a second air permeability of at least 15 Darcy (14,805×10⁻¹² m²), wherein the first permeability and the second permeability are measured by flowing air at atmospheric pressure and ambient temperature in a direction perpendicular to the plane of each adsorbent layer of a known thickness and by measuring the pressure drop across the layer at a given gas flow velocity under the above conditions.

Preferably, at least one of the high density layer and the low density layer comprises at least one member selected from the group consisting of activated carbon, zeolites, alumina and silica gel. In certain embodiments, at least one of the high density layer and the low density layer is impregnated with metal salts, and/or modified by oxidation, reduction and/or ion exchange. The high density adsorbent and the low density adsorbent can be made out of the same adsorptive material and have similar affinities for the components in the feed gas or can be made out of different adsorbents with different adsorption affinities for different components in the feed gas. For example, the high density layer can be made out of an adsorbent, which has strong affinity for component "a" while the high permeability adsorbent layer would have high affinity for component "b" in the feed gas.

The low density layer of the present invention is preferably a cloth or a fabric. The terms "cloth" and "fabric" are used interchangeably herein and can be a woven or nonwoven material. The cloth of the present invention preferably contains pores having an average diameter in excess of that necessary to separate oxygen from nitrogen in air. More particularly, adsorbent cloths of the present invention have average pore diameters greater than 5 Å, and preferably from about 12 Å to about 15 Å. Preferably, the adsorbent cloth of this invention is selected from a group of equilibrium selective materials with a preferred carbon dioxide mass transfer coefficient of at least 0.5 sec⁻¹, more preferably at least 1.0 sec⁻¹. The thickness of the cloth is preferably 0.5 mm or smaller.

The high density layer of the present invention is preferably a sheet or a layer manufactured by enmeshing fine adsorbent particulates, preferably active carbon nanoparticles, with larger particles of activated carbon and a fibrillated polymer. The material is processed in a sheet form and is characterized by a large sheet surface area and large sheet micro pore volume to a total sheet volume ratio.

In certain embodiments, the high density adsorbent comprises a plurality of high density layers having an average first density of at least 0.4 g/cc and/or the low density adsorbent comprises a plurality of low density layers having an average second density of less than 0.4 g/cc.

Adsorbents of the gas adsorption composite of the present invention are preferably arranged to alternate. The term "alternating" is intended to encompass an embodiment comprising only two layers, one of each kind.

In certain embodiments of the present invention, the adsorbent system, can be formed of (1) at least one thin layer of an adsorbent sheet with low gas permeability, high bulk density and (2) at least one layer of a woven or non-woven fibrous adsorbent, for example a cloth with high gas permeability and low bulk density, wherein permeability of each layer is measured in the axial and transverse direction.

In certain embodiments of the present invention, alternating adsorbent layers form a spirally wound structure as known in the art. Two adsorbent layers of different density are rolled together around a mantel in a spiral-wound configuration, and the process gas is fed in a direction tangential to the layers.

Preferably, rolling or wrapping of layers is done in a careful manner to provide a symmetrical and homogenous packing wherein layers are substantially parallel to each other.

The spiral-wound configuration can comprise a plurality of high density layers (HDL) alternating with a plurality of low density layers (LDL) preferably arranged in a HDL/LDL ratio of about 0.25 to about 4.0. Compositions with an HDL/LDL ratio of 1, 0.5, and 2.0 are also suitable for practicing the present invention wherein the order or high density layer(s) and low density layer(s) can be changed according to the process requirements.

In certain embodiments of the present invention, alternating adsorbent layers form a stacked configuration as known in the art. The process gas is then fed radially between the adsorbent layers.

In addition, adsorbent layers of the present invention can have various thickness; preferably the low density layer is about 0.2 to about 2 times thicker than the high density layer.

In certain embodiments, the gas adsorption composite of the present invention includes a high density layer with a first mass transfer coefficient of at least 0.5 sec⁻¹ and a low density layer with a second mass transfer coefficient of at least 0.5 sec⁻¹ and has a composite mass transfer coefficient of at least 0.5 sec$^{-1}$. Preferably, the gas adsorption composite is adapted for use in a cyclic adsorptive/regenerative process.

The invention also provides a pressure swing adsorption process for recovering a product gas from a feed gas, said process comprising supplying a pressure swing adsorption apparatus comprising a gas adsorption composite which includes a high density adsorbent comprising a high density layer having a first density of at least 0.3 g/cc and a low density adsorbent comprising a low density layer having a second density of less than 0.3 g/cc, wherein the high density adsorbent is in a substantially contiguous contact with the low density adsorbent. Each of the high density adsorbent and the low density adsorbent has an adsorbent surface area of at least 500 m$^2$/g and preferably at least 1000 m$^2$/g. The pressure swing adsorption process of the present invention further includes feeding a feed gas into said pressure swing adsorption apparatus during a feed period not exceeding 100 seconds and recovering said product gas from said pressure swing adsorption apparatus.

Preferably, the high density layer used in the process of the present invention has a first transfer coefficient of at least 0.5 sec$^{-1}$, the low density layer has a second mass transfer coefficient of at least 0.5 sec$^{-1}$ and the composite has a composite mass transfer coefficient of at least 0.5 sec$^{-1}$.

In certain embodiments of the present invention, the feed period is up to 40 seconds, preferably up to 15 seconds, and more preferably up to 3 seconds.

The process of the present invention is preferably conducted at the following non-limiting condition:

(a) the feed gas is provided at a temperature of 0 to 100° C., preferably 0 to 50° C., and is fed into the apparatus at a feed pressure from 1.5 atm absolute to 40 atm absolute;

(b) gas flow is preferably parallel to the adsorbent layers forming the adsorbent structure. Preferably, the feed gas flows axially between the layers. The feed gas flows in the Y direction from one end of the adsorbent cartridge to the other end where the product stream is recovered; and (c) the process gas to be separated in the process of the present invention includes H$_2$, air, CO, hydrocarbon, and the like.

The product of the invention is preferably hydrogen gas of high purity. Thus, the invention is capable of providing product gas containing at least 99.9% hydrogen, preferably at least 99.99% hydrogen.

The invention will be illustrated in more detail with reference to the following Examples, but it should be understood that the present invention is not deemed limited thereto.

EXAMPLES

Example 1

Table 1 shows the kinetics of the high permeability adsorbent layer (cloth) and of the high density adsorbent layer (sheet). The CO$_2$ uptakes were measured in a standard volumetric adsorption apparatus by measuring the decay in pressure as a function of time. Derivation of the linear driving force mass transfer coefficient is described in "Principles of Adsorption and Adsorption Processes" by D. Ruthven, John Wiley and Sons (1984).

TABLE 1

Comparison between diffusion rate constants of the activated carbon cloth, granules and the monolith CO$_2$ using a linear driving force model.

| Adsorbent | High permeability layer (Cloth) | High density layer (Sheet) | Granules (2 mm) |
| --- | --- | --- | --- |
| k (sec$^{-1}$) | 1.5 | 1.0 | 0.1 |

The mass transfer parameters were measured experimentally. They represent the high mass transfer rate necessary to achieve efficient separation under rapid cycle PSA conditions. The fast mass transfer rate translates into a short mass transfer zone, efficient utilization of the adsorbent, and consequently, into possible reduction of the length of the adsorbent bed.

Example 2

Technical information on the working equilibrium capacity per unit volume and unit weight of adsorbent are provided for CO$_2$ adsorption on activated carbon adsorbents with the following configurations: a spirally wound low density adsorbent (a cloth), 1 mm granules, a high density adsorbent (a sheet) and a spirally wound multilayered adsorbent composition comprising one layer of high density adsorbent and one layer of low density adsorbent (sheet+cloth).

Process cycle simulations were performed for adsorbents described in Tables 2–3 and FIG. 1 and at the following conditions:

| | |
| --- | --- |
| Dimensions: | 5 ft (1.74 m) long column, 1 ft (0.305 m) inside diameter; |
| Temperature: | 70° F. (21.1° C.); |
| Process gas: | 20% CO$_2$ in hydrogen; |
| Pressure: | 120 psig (0.83 MPa); |
| Product purity: | 1,000 ppm CO$_2$ in product; |
| System: | 4 bed H$_2$ PSA system with one pressure equalization (See U.S. Pat. No. 3,430,418 to Wagner); |
| Time on feed: | the time on feed was varied between 15 and 1 sec (15, 12, 9, 6, 4.5, 3, 2 and 1 sec). |

TABLE 2

Comparison of the CO$_2$ working capacities at 30° C. of activated carbon granules, a high density carbon layer (sheet), and a low density carbon layer (cloth A).

| Adsorbent | Low density layer (Cloth A) | High density layer (Sheet) | 1 mm Granules |
| --- | --- | --- | --- |
| Working capacity, 0.5 and 5 atm (mmole/g) | 3.7 | 5.8 | 4.1 |
| Working capacity, 0.5 and 5 atm (mmole/cc) | 0.95 | 2.90 | 2.10 |
| Density (g/cc) | 0.26 | 0.50 | 0.51 |
| Air permeability at atm pressure (Darcy) | 56 | 0.00195 | N/A |
| Surface area (m$^2$/g) | 1500 | 1200 | 1200 |

Table 2 shows that, due to its low bulk density, the low density layer (cloth A) alone exhibits the lower volumetric $CO_2$ equilibrium capacity than that of the high density layer (sheet) or 1 mm granular adsorbent.

Example 3

FIG. 1 shows breakthrough profiles collected for the spirally wound low density adsorbent (a cloth), 1 mm granules, and the spirally wound multilayered adsorbent composition (sheet+cloth). The breakthrough profiles were generated at ambient temperature, 50 psig (0.34 MPa), 1% CO2 in helium and at the same gas superficial velocity of 2.5 lbmol/ft$^2$/hr (0.082 m/sec at one atmosphere and 20 ° C.).

The feed gas flows in the Y direction. Pure helium at atmospheric pressure is also used in the same flow configuration to measure the pressure drop across the adsorbent cartridge at a given gas flow velocity which allows to calculate the helium permeability for each adsorbent cartridge. A geo factor was obtained by fitting the breakthrough profiles with a simulation tool using a Dusty Gas Model as a mass transfer model. The Dusty Gas Model applies to trace and bulk separations and captures the flow of components within the adsorbent via viscous flow, bulk diffusion, and Knudsen diffusion. The Dusty Gas Model uses only two fundamental parameters such as the average macropore diameter (dm) and the geometric factor b, referred herein as "the geo factor." These parameters can be calculated using adsorbent characterization data and/or by fitting breakthrough profiles measured at two different pressures. These two parameters are independent from composition, pressure and temperature. Consequently, the same parameters apply to all gases and all typical operating conditions for a given adsorbent. The geo factor b can also be estimated from the following equation:

$$b=60(1-e)E/(td^2)$$

wherein e is the inter-pellet volume, E is the macropore volume, t is the macropore tortuosity, and d is the effective pellet diameter.

Since the simulator is designed for granular adsorbent form, when evaluating the performance of structured adsorbent forms with Simpac, the interstitial void and the particle diameter of the adsorbent beads are chosen to match the structured adsorbent pressure drop over the range of purge flow rate.

The larger geo factor is representative of faster kinetics. Both FIG. 1 and Table 3 show the advantage of the multi-layered sheet+cloth adsorbent composite as compared to the cloth alone or a classic 1 mm granular adsorbent.

Based on experimental results, the multilayered sheet+cloth adsorbent composite is clearly a good compromise between an adsorbent with fast kinetics but low volumetric capacity (like the cloth alone) and an adsorbent with high volumetric capacity but with slow kinetics and fluidization issues under fast cycle conditions (like the 1 mm granular adsorbent).

TABLE 3

Geo factor, bed density, and permeability for activated carbon sheet + cloth composite, cloth alone, and 1 mm granules

| Adsorbent | Sheet + cloth A | Cloth A | 1 mm Granules |
| --- | --- | --- | --- |
| Geo factor, cm$^{-2}$ | 900 | 500 | 500 |
| Bed density, lb/ft$^3$, (g/cm$^3$) | 19.9 (0.32) | 11.9 (0.19) | 32.2 (0.52) |
| Helium permeability at atm pressure, Darcy (m$^2$) | 1.63 (1.609 × 10$^{-12}$) | 4.07 (4.067 × 10$^{-12}$) | 4.07 (4.067 × 10$^{-12}$) |

Figure 2:
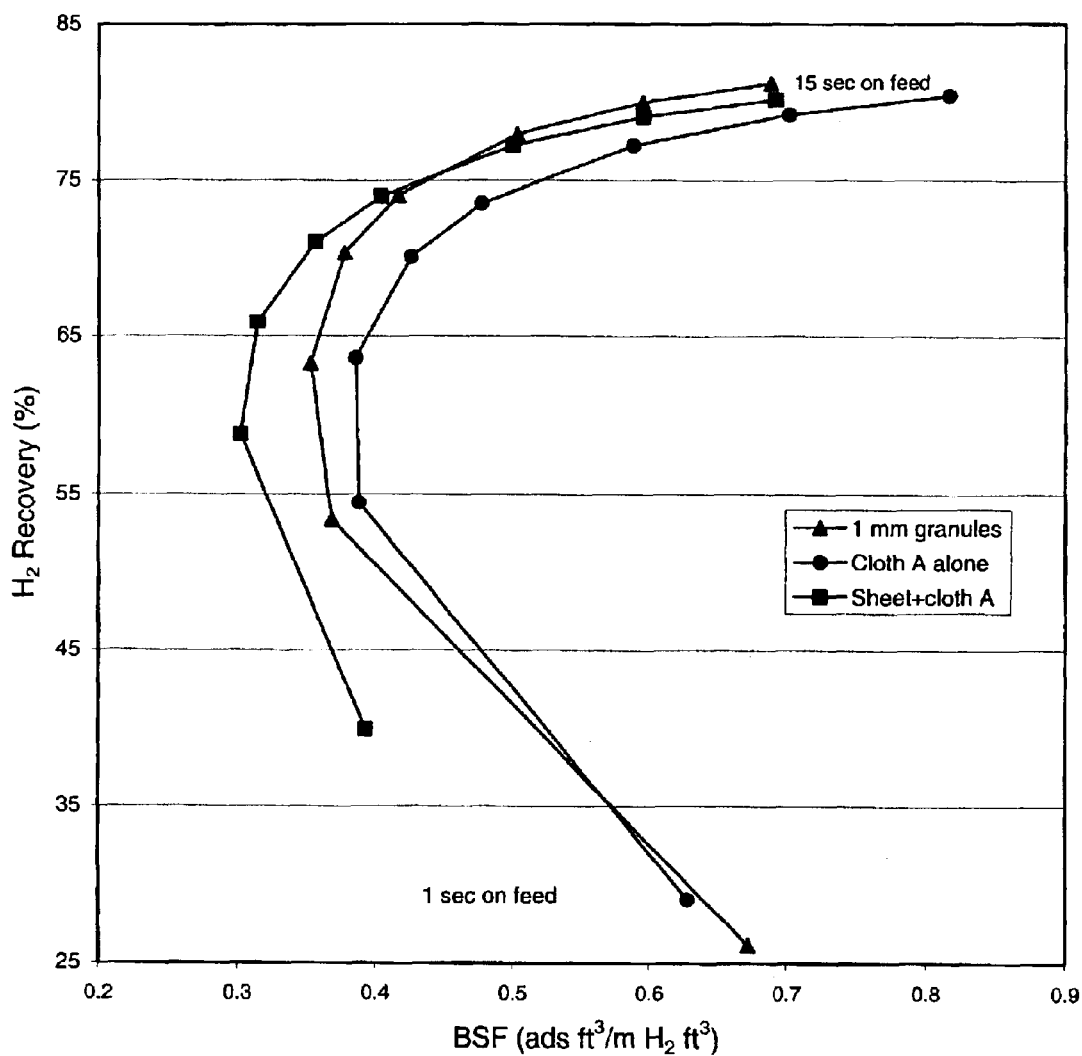
FIG. 2 is a graph showing an increase in $H_2$ recovery as a function of time on feed and a bed sizing factor for three adsorbent systems including a cloth, a sheet+cloth composite of the present invention, and 1 mm granules.

FIG. 2 compares the overall process cycle performance results obtained for the three adsorbent systems studied, in terms of bed sizing factor (BSF) and H$_2$ recovery. Processes with improved H$_2$ recovery are preferred. Lower BSF's are desirable since they correspond to a lower bed volume required to produce a given amount of H$_2$. It is clear that at a cycle time below 7 seconds on feed for a given H$_2$ recovery, smaller beds (lower BSF) can be utilized with the sheet+cloth composite of the present invention. Above 4 seconds on feed, a bed sizing factor and H$_2$ recovery performance of the sheet+cloth composite are comparable to that of the 1 mm granular adsorbent. However, between 7 and 15 seconds feed, the bed sizing factor and H$_2$ recovery performance of the sheet+cloth composite are significantly better that of the 1 mm granular adsorbent because the 1 mm granules fluidize at feed times less than 15 seconds. It is demonstrated that at very short cycle time, e.g., below 3 seconds on feed, the profile of the sheet+cloth composite strongly differs from the profiles of 1 mm granules or the cloth. Under those fast cycle conditions, the sheet+cloth composite offers even stronger advantage when the absorber size has to be reduced further.

In addition, the utilization of the cloth alone suffers from the difficulty encountered when attempting to homogeneously pack the adsorbent. The imperfections in the packing cause increased dispersion, which affects the mass transfer zone. The mass transfer zone becomes stretched and bigger than it would have been under perfect packing conditions. Consequently, the intrinsic cloth adsorption kinetics may, under those imperfect packing conditions, be interpreted erroneously and underestimated. If, however, the cloth is packed together with another layered material that provides extra support, e.g., a high density adsorbent layer, the packing can be considerably improved, and the adsorption kinetics would no longer be disturbed by dispersion.

The partial pressure gradient in a bed packed with cloth is modified also when sheet layers are introduced between the cloth layers resulting in a difference between the adsorption kinetics properties of the cloth alone and the sheet+cloth composite. These two combined effects explain the difference in the kinetics properties and the corresponding geo factors of both adsorbent systems. This is illustrated by the data presented in Table 3 above which are based on experimental breakthrough measurements. As shown in Table 3, the cloth A's geo factor of 500 is significantly lower than the sheet+cloth A composite's geo factor of 900.

Example 4

There is a trade-off between pressure drop and bulk density with a very strong effect from the thickness ratio of the high density layer of the present invention to the low density layer. On one hand, when the contribution of the high density adsorbent layers to the total adsorbent mass increases, the bed pressure drop and bulk density increase, and the total void fraction decreases. On the other hand, when the contribution of the low density adsorbent layers to the total adsorbent mass increases, the pressure drop and bulk density decrease and the total void fraction increases. Thus, the overall adsorber design can be tailored to the acceptable level of pressure drop, void fraction, and volumetric capacity by modifying the relative thickness of the low density and the high density adsorbent layer(s). Also, modification of the adsorber's geometry can contribute to the separation's optimization. At a given feed flowrate, decreasing the adsorber's length and increasing its diameter while retaining the mass transfer zone can reduce the linear gas velocity, the pressure drop, and consequently improve the product recovery.

Figure 3:
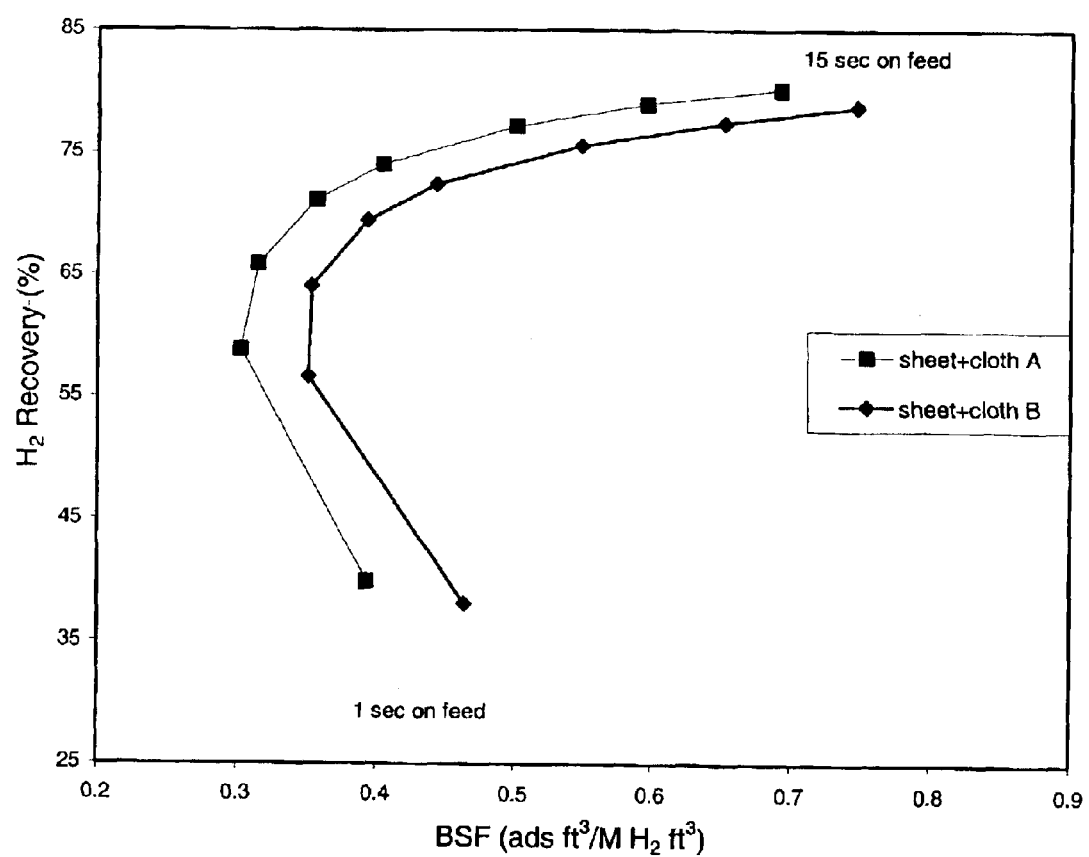
FIG. 3 is a graph showing an increase in $H_2$ recovery as a function of time on feed and a bed sizing factor for two sheet+cloth composites of the present invention (sheet+cloth A and sheet+cloth B) having different thickness of the low density layers.
Figure 4:
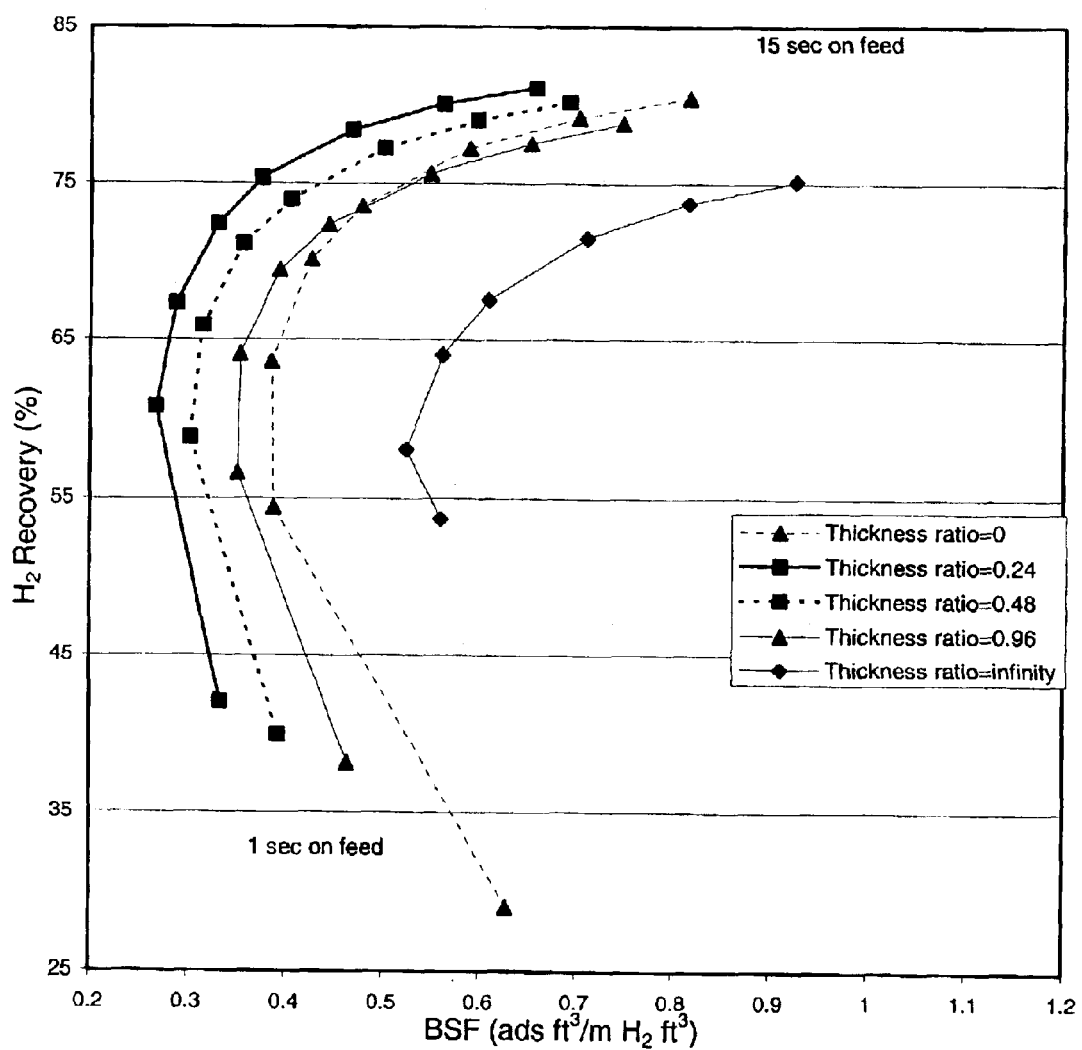
FIG. 4 is a graph showing an increase in $H_2$ recovery as a function of time on feed and a bed sizing factor for sheet+cloth composites of the present invention with a variable ratio of a high density layer thickness to a low density layer thickness.

This is further illustrated in Table 4 and FIG. 3. The sheet+cloth A composite, described above, is compared to the sheet+cloth B composite. The sheet+cloth B adsorbent composite has high density adsorbent sheet of the same thickness as the sheet+cloth A adsorbent composite but the low density adsorbent layer is twice thinner than that of the cloth A. Using the thinner low density adsorbent layer results in lower permeability and total void as well as higher density of sheet+cloth B composite. The very strong effect of permeability and pressure drop on the overall process cycle performance is illustrated in FIG. 4. At a small decrease in bed density and total void fraction, an increase in the permeability results in a 35% decrease in the bed sizing factor at 75% $H_2$ recovery.

TABLE 4

Geo factor, bed density, void fraction, and permeability for activated carbon sheet + cloth composites.

| Adsorbent | Sheet + cloth A | Sheet + cloth B |
|---|---|---|
| Geo factor (cm$^{-2}$) | 900 | 900 |
| Bed density (lb/ft$^3$) | 19.9 | 22.1 |
| Permeability (Darcy) | 1.63 | 0.78 |

Since a high permeability adsorbent by nature also exhibits low density and vice versa, an optimum in the performance of a multilayer adsorbent system as a function of the thickness ratio between low density and high density adsorbent layers' thickness should be observed. If the thickness ratio of high density adsorbent to low density adsorbent is:

(a) further decreased to asymptotically approach the situation where only the low density adsorbent is used, the loss in bed density and the increase in total void fraction will eventually overcome the advantage associated with its high permeability. The low pressure drop advantages would be hindered by a significant loss in volumetric capacity and the resulting increase in the bed size;

(b) further increased to asymptotically approach the situation where only the high density adsorbent is used, the loss in permeability will eventually overcome the advantage associated with high density and low void fraction. The low void fraction and high volumetric capacity would be hindered by the very high pressure drop and the resulting loss in recovery.

This relationship is further illustrated in Example 5 presented below.

Example 5

The cloth adsorbent system and the sheet adsorbent system were compared to the sheet+cloth adsorbent system at various ratios of a sheet's thickness to a cloth's thickness. Both the cloth adsorbent system and the sheet adsorbent system were considered as two particular cases of the sheet+cloth system where the sheet thickness is, respectively, zero and infinity. In both cases, the packing density was assumed to be equal to the adsorbent layer density. The permeability of the cloth alone system was measured experimentally. The permeability of the sheet adsorbent system was estimated since homogeneously packing the sheet adsorbent system is very difficult because of channeling occurring when the adsorbent system exhibits a very high pressure drop. Helium permeability of 0.13 Darcy (0.132×10$^{-12}$ m$^2$) at atmospheric pressure was chosen as a conservative estimate of what the permeability of a perfectly packed sheet adsorbent system would be. In reality, the inventors anticipate helium permeability of such system to be lower than 0.13 Darcy (0.132×10$^{-12}$ m$^2$) at atmospheric pressure and, therefore, providing less favorable results than those obtained in the example for an infinite sheet to cloth thickness ratio.

Table 5 summarizes the input parameters used in an adsorption simulation package to simulate the 4-bed PSA performances. FIG. 4 and Tables 6–7 summarize the performance results for feed times between 1 and 15 seconds. While FIG. 4 shows the performances at 15, 12, 9, 6, 4.5, 3, 2 and 1 seconds on feed, Tables 6–7 only show the data graphically represented in FIG. 4 at feed times of 15, 6, and 2 seconds.

TABLE 5

Geo factor, bed density, void fraction, and permeability for an adsorber containing activated carbon sheet + cloth composites.

| Adsorbent | Cloth | Sheet + cloth | Sheet + cloth | Sheet + cloth | Sheet |
|---|---|---|---|---|---|
| Sheet thickness (mm) | 0.0 | 0.20 | 0.20 | 0.20 | 0.20 |
| Cloth thickness (mm) | 0.42 | 0.84 | 0.42 | 0.21 | 0.0 |
| Sheet to cloth thickness ratio | 0.0 | 0.24 | 0.48 | 0.96 | Infinity |
| Geo factor (cm$^{-2}$) | 500 | 900 | 900 | 900 | 900 |
| Bed density (lb/ft$^3$) | 11.9 | 18.5 | 19.9 | 22.1 | 30.6 |
| Helium permeability at atm pressure (Darcy) | 4.07 | 3.26 | 1.63 | 0.78 | 0.13 |

TABLE 6

$H_2$ recovery as function of feed time for sheet + cloth composites with various thickness ratios

| Sheet to cloth thickness ratio | 0.0 | 0.24 | 0.48 | 0.96 | Infinity |
|---|---|---|---|---|---|
| 15 sec | 80.43 | 81.13 | 80.20 | 78.84 | 75.16 |
| 6 sec | 73.57 | 75.34 | 74.00 | 72.36 | 67.55 |
| 2 sec | 54.43 | 60.79 | 58.85 | 56.62 | 51.98 |

TABLE 7

Bed sizing factor as function of feed time for sheet + cloth with various thickness ratios

| Sheet to cloth thickness ratio | 0.0 | 0.24 | 0.48 | 0.96 | Infinity |
|---|---|---|---|---|---|
| 15 sec | 0.82 | 0.66 | 0.69 | 0.75 | 0.93 |
| 6 sec | 0.48 | 0.37 | 0.40 | 0.44 | 0.61 |
| 2 sec | 0.39 | 0.27 | 0.30 | 0.35 | 0.49 |

Clearly, the data presented in Tables 6 and 7 show an optimum in BSF and $H_2$ recovery for the sheet to cloth thickness ratio between about 0.48 and about 0 at feed times between about 1 and about 15 seconds.

As stated above, the abrupt performance degradation observed when changing the thickness ratio from 0.24 to 0 results from the change in adsorbent structure and the corresponding change in the adsorbent kinetics properties and packing. Indeed, when shifting from a sheet+cloth to a cloth alone adsorbent system, the intrinsic kinetics properties of the adsorbent system change and the quality of the packing drops. These combined effects cause the mass transfer zone to spread and, consequently, the geo factor to decrease, as shown in Table 3 and FIG. 2. It was also shown that the kinetic properties, the quality of the packing, and the geo factor could be maintained while reducing the thickness ratio from 0.96 to 0.48 (see Table 4 and FIG. 3). Further reduction in the thickness ratio from 0.48 to 0.24 can be easily performed without degradation in the adsorbent mass transfer properties. For that reason, the geo factor was also maintained constant at 900 while further reducing the thickness ratio to 0.24. However, if performance results were to be simulated for the thickness ratio between about 0 and about 0.24, it would be desirable to accordingly decrease the geo factor to account for the degradation in kinetics properties and in packing homogeneity which occur when the cloth alone condition is approached. Continuity in performance results is more apparent among sheet+cloth and cloth alone systems when a progressive approach of the sheet+cloth performance profile to the cloth alone performance profile is used while further reducing the sheet+cloth to cloth alone thickness ratio.

Example 6

Experimental data have also been generated under fast cycle pressure swing conditions. A one bed RPSA system was used to compare various adsorbent configurations in a range of cycle times. The adsorbent vessel used was 8 inch long, and had the inside diameter of 1.4 inch. The feed gas stream comprised 20% $CO_2$ in helium at 100 psig. The process was performed at room temperature. The PSA cycle comprised the repeating cyclic sequence of a concurrent steps such as repressurization, a high pressure feed, countercurrent blowdown, and, finally, a countercurrent helium purge. The performance data were collected for a purity of 50 ppm $CO_2$ in the product stream. A 1 mm granular activated carbon, a spirally wound cloth, and a spirally wound sheet+cloth were compared. The same cloth was utilized in the cloth alone and sheet+cloth systems. The thickness ratio in the sheet+cloth system was 1.0.

Figure 5:
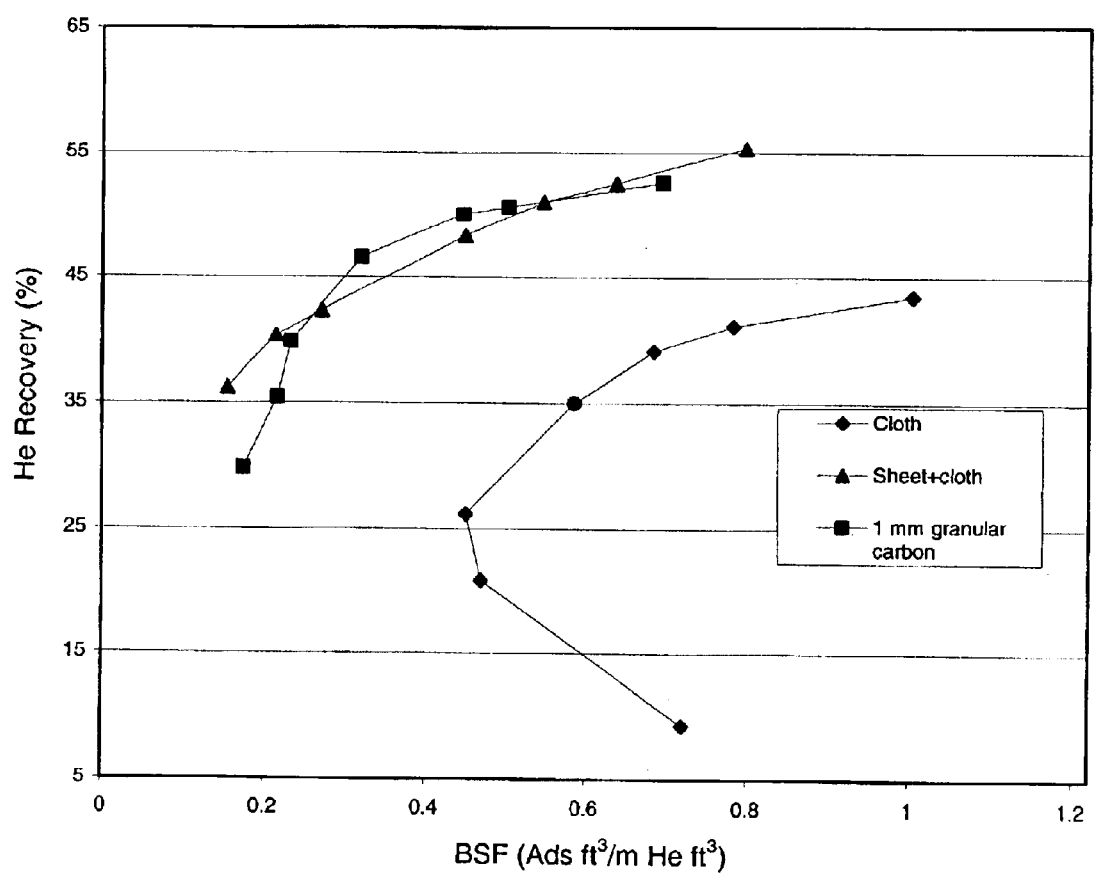
FIG. 5 is a graph showing an increase in $H_2$ recovery as a function of time on feed and a bed sizing factor for three adsorbent systems including a cloth, a sheet+cloth composite of the present invention, and 1 mm granules.

FIG. 5 shows the performances at 12, 8, 6, 4, 2, 1.5, and 1 second on feed for bed sizing factor and helium recovery. Clearly, the observed performance of the sheet+cloth system is much higher than that of the cloth alone. Thus, a much smaller adsorbent vessel can be used with the sheet+cloth system minimizing the PSA's size and costs. Performance of the sheet+cloth system is comparable to that of a 1 mm granular activated carbon material at above 2 seconds feed time and superior to that of a 1 mm granular activated carbon at below 2 seconds on feed. A vessel containing 1 mm adsorbent granules would fluidize at cycle times below one minute (feed times below 15 seconds). Thus, one of the advantages of the present invention is in that the vessel containing the adsorption composite of the present invention will not fluidize at any cycle time.

While the invention has been described in detail and with reference to specific examples thereof, it will be apparent to one skilled in the art that various changes and modifications can be made therein without departing from the spirit and scope thereof.

What is claimed is:

1. A gas adsorption composite comprising:

a high density adsorbent comprising a high density layer having a first density of at least 0.3 g/cc; and a low density adsorbent comprising a low density layer having a second density of less than 0.3 g/cc, wherein the high density adsorbent is in a substantially contiguous contact with the low density adsorbent, and each of the high density adsorbent and the low density adsorbent has an adsorbent surface area of at least 500 $m^2/g$.

2. The composite of claim 1, wherein the high density layer has a first air permeability greater than 0 and up to about 0.5 Darcy ($0.494 \times 10^{-12}$ $m^2$), and the low density adsorbent has a second air permeability of at least 15 Darcy ($14,805 \times 10^{-12}$ $m^2$), the first air permeability and the second air permeability being measured at atmospheric pressure and ambient temperature.

3. The composite of claim 1, wherein the high density adsorbent comprises a plurality of high density layers having an average first density of at least 0.4 g/cc and/or the low density adsorbent comprises a plurality of low density layers having an average second density of less than 0.4 g/cc.

4. The composite of claim 3, wherein the high density layers and the low density layers are in a ratio of about 0.25 to about 4.0.

5. The composite of claim 1, wherein at least one of the high density layer and the low density layer comprises at least one member selected from the group consisting of activated carbon, zeolites, alumina and silica gel.

6. The composite of claim 5, wherein at least one of the high density layer and the low density layer is impregnated with metal salts, and/or modified by oxidation, reduction and/or ion exchange.

7. The composite of claim 1, wherein the high density adsorbent and the low density adsorbent are alternating layers.

8. The composite of claim 7, wherein said alternating layers form a spirally wound structure.

9. The composite of claim 1, wherein the low density layer is about 0.2 to about 2 times thicker than the high density layer.

10. The composite of claim 1, wherein the high density layer has a first transfer coefficient of at least 0.5 $sec^{-1}$, the low density layer has a second mass transfer coefficient of at least 0.5 $sec^{-1}$, said composite has a composite mass transfer coefficient of at least 0.5 $sec^{-1}$, and wherein said composite is adapted for use in a cyclic adsorptive/regenerative process.

11. A pressure swing adsorption process for recovering a product gas from a feed gas, said process comprising:

supplying a pressure swing adsorption apparatus comprising a gas adsorption composite of claim 1;

feeding a feed gas into said pressure swing adsorption apparatus during a feed period not exceeding 100 seconds; and recovering said product gas from said pressure swing adsorption apparatus.

12. The process of claim 11, wherein the high density layer has a first transfer coefficient of at least 0.5 $sec^{-1}$, the low density layer has a second mass transfer coefficient of at least 0.5 $sec^{-1}$, and said composite has a composite mass transfer coefficient of at least 0.5 $sec^{-1}$.

13. The process of claim 12, wherein the high density layer has a first air permeability of above 0 and up to 0.5 Darcy ($0.494 \times 10^{-12}$ m$^2$), and the low density adsorbent has a second air permeability of at least 15 Darcy ($14.805 \times 10^{-12}$ m$^2$), the first air permeability and the second air permeability are measured at atmospheric pressure and ambient temperature.

14. The process of claim 12, wherein the high density adsorbent consists of a plurality of high density layers having an average first density of at least 0.4 g/cc and/or the low density adsorbent consists of a plurality of low density layers having an average second density of less than 0.4 g/cc.

15. The process of claim 12, wherein at least one of the high density layer and the low density layer comprises at least one member selected from the group consisting of activated carbon, zeolites, alumina, and silica gel.

16. The process of claim 12, wherein at least one of the high density layer and the low density layer is modified by impregnation with metal salts, oxidation, reduction and/or ion exchange.

17. The process of claim 12, wherein the high density adsorbent and the low density adsorbent are alternating layers.

18. The process of claim 17, wherein said alternating layers form a spirally wound structure.

19. The process of claim 12, wherein the high density layers and the low density layers are in a ratio of about 0.25 to about 4.0.

20. The process of claim 12, wherein the feed period is up to 40 seconds.

21. The process of claim 12, wherein the feed period is up to 15 seconds.

22. The process of claim 12, wherein the feed period is up to 3 seconds.

23. The process of claim 12, wherein said feed gas comprises a mixture of hydrogen and at least one other component selected from the group of air, carbon dioxide, carbon monoxide, hydrocarbon, oxygen, argon, and nitrogen.

* * * * *

UNITED STATES PATENT AND TRADEMARK OFFICE
CERTIFICATE OF CORRECTION

PATENT NO. : 6,893,483 B2
DATED : May 17, 2005
INVENTOR(S) : Catherine Marie Anne Golden, Timothy Christopher Golden and Paula Jean Battavio It is certified that error appears in the above-identified patent and that said Letters Patent is hereby corrected as shown below:

Column 1,
Line 12, insert the following paragraph before "BACKGROUND OF THE INVENTION":
-- STATEMENT REGARDING FEDERALLY SPONSORED RESEARCH OR DEVELOPMENT
   This invention was made with Government support under Contract No.: DE-FC36-02AL67613 awarded by the Department of Energy. The government has certain rights in this invention. --.

Signed and Sealed this

Sixth Day of June, 2006

JON W. DUDAS
*Director of the United States Patent and Trademark Office*